June 5, 1945.  E. B. ETCHELLS  2,377,681
METHOD OF MAKING BEARINGS
Filed May 20, 1943

Inventor
Eugene B. Etchells
By Blackmore, Spencer & Flint
Attorneys

Patented June 5, 1945

2,377,681

UNITED STATES PATENT OFFICE 2,377,681

METHOD OF MAKING BEARINGS

Eugene B. Etchells, Grosse Pointe Farms, Mich., assignor to General Motors Corporation, Detroit, Mich., a corporation of Delaware Application May 20, 1943, Serial No. 487,707

2 Claims. (Cl. 29—149.5)

This invention has to do with the method of making bearings consisting of a cylindrical bearing back provided with a lining of bearing metal both inside and outside. Such bearings are used, among other things, for wrist pins for internal combustion engines and are usually mounted so that they may rotate thereby evenly distributing the wear.

In the manufacture of such bearings it has been customary to form a cylindrical shell of steel or other metal having the required strength to serve as a bearing back, and to then secure to the inside and outside of the shell a lining of bearing metal by casting or plating. It is essential that the bearing metal be securely bonded to the back otherwise it may separate from the back and the bearing and the engine may fail. With this method of manufacture difficulty is encountered in securing a good bond between the bearing metal and the back because ordinarily the lined bearing is not subjected to heat and pressure or other working that would tend to improve the bond. Furthermore it frequently happens that the bearing is almost finished before poor bonding is discovered so that it must be rejected with a considerable loss of labor.

According to my invention the bearing is made of a pair of cylinders each formed from clad sheet metal as described and claimed in my copending application Serial No. 489,892, filed June 7, 1943. The clad metal preferably consists of a steel back to which bearing metal such as copper or silver is bonded with or without an intermediate metal. In the manufacture of such clad metal, after fusing or bonding the bearing metal to the sheet, it is rolled to the desired thickness usually accompanied by the application of heat. This rolling tends to improve the bond and also reveals poor bonding as the metal layers tend to separate during rolling if the bonding is poor.

From the clad metal, bearings may be formed by any desired method. I prefer the method described and claimed in the above application in which the sheet metal is formed into cups by successive drawing operations accompanied by annealing. The bottoms are removed from the cups and the cylindrical bearings thus formed are then machined to finished dimensions. The drawing operation constitutes a further check on the bond thereby eliminating the remaining poorly bonded sheet material before the expensive machining operations.

According to my invention two cylindrical bearings are formed preferably in the manner described, one with the bearing material outside and the other with the bearing material inside. The outside diameter of the latter is made slightly larger than the inside diameter of the former. The smaller cylinder is then pressed into the larger cylinder thereby producing a composite bearing lined inside and outside with bearing metal. Most of the machining of the bearing sleeves will be done prior to pressing them together but a small amount of machining will be necessary after assembly to remove any distortion that may result from the pressing operation.

The finished bearing will be found to be substantially free from bonding defects. The annealing incident to drawing will give the desired softness and antifriction properties to the bearing surfaces. There is no likelihood of the sections of the bearing moving relatively to each other owing to the press fit and the fact that in the operation of the bearing there are no forces of consequence tending to cause separation.

10 indicates a blank of sheet metal, preferably steel, provided at 12 with a lining of bearing metal such as copper or silver thermally bonded thereto, with or without the interposition of an intermediate metal. Clad metal of this type is available on the market and is usually made by thoroughly cleaning the steel, applying a thin layer 12 of bearing metal to the steel and uniting them by means of heat and pressure as by hot rolling. To secure the best bonding this should be done under a non-oxidizing atmosphere. In some instances an intermediate layer of solder or bonding metal may be provided between the bearing metal and the back. In the case of silver a suitable silver solder or a thin layer of copper may be found desirable as an intermediate bonding metal.

Figure 1:
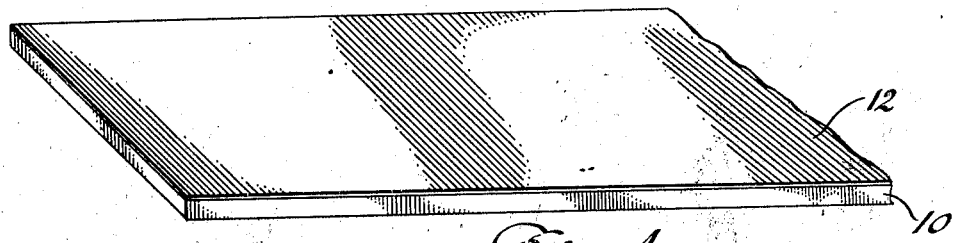
Figure 1 is a view of a blank of clad metal from which one of the bearing elements may be made.
Figure 2:
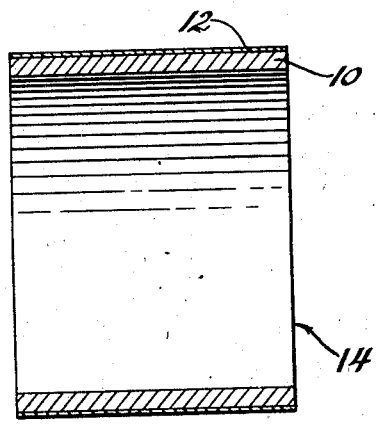
Figure 2 is a longitudinal section through an outer bearing element.
Figure 3:
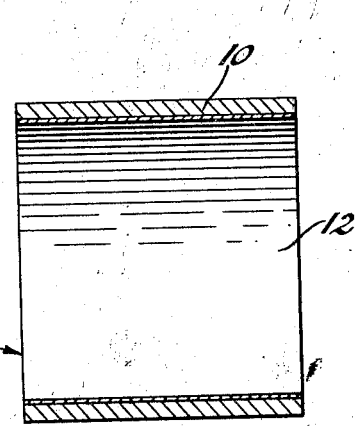
Figure 3 is a similar view of an inner bearing element.

The clad metal may be supplied in strips or circular blanks and from it the cylindrical bearing elements shown in Figures 2 and 3 may be formed. I prefer to form the blanks in the manner described and claimed in my said copending application Serial No. 489,892. This method consists in drawing the clad metal into cup form, cutting off one end of the cup and machining the resulting cylinder to finished dimensions. However, if preferred, the bearing may be formed by bending the strip into circular shape and uniting its ends by welding.

In Figure 2 there is illustrated the outer bearing element having the bearing metal 12 disposed on its outer side while Figure 3 shows the inner bearing element with the bearing metal 12 disposed on its inner side.

Figure 4:
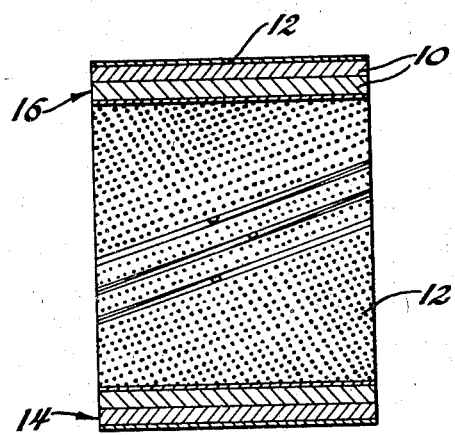
Figure 4 is a like view through the finished bearing.
Figure 5:
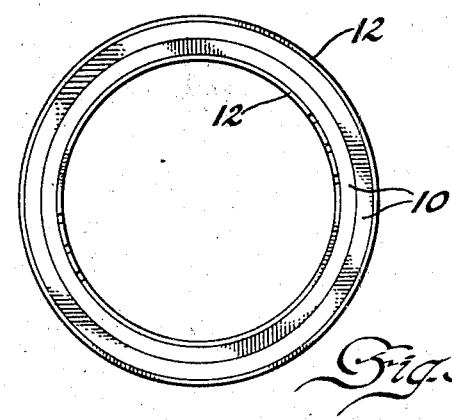
Figure 5 is an end elevation of the finished bearing.

The bearing elements are then assembled by pressing into the form shown in Figure 4. In order to secure a tight press fit the outer diameter of the inner bearing element 16 is preferably made slightly greater than the inner diameter of the bearing element 14.

Following the pressing of the elements together some additional machining may be required to remove the effects of distortion resulting from the pressing operation. It may also be found desirable, as described and claimed in the prior application of Alfred W. Schluchter, Serial No. 342,061, filed June 24, 1940, to produce gridded surfaces on the bearing by knurling preferably after the elements are assembled, as shown in Figure 4. The oil grooves may also be formed at this time. Following knurling the bearing surfaces are preferably provided with a thin coating of soft metal, such as lead, having the desired frictional properties. The lead may be applied by electroplating or otherwise. If desired, an alloy of lead and tin or lead and indium may be plated on the bearing in place of pure lead in order to secure resistance to the corrosive effects of lubricating oils. However, if preferred, the tin or indium may be applied in a very thin coating by electroplating and by subsequent heat treatment may be caused to diffuse into the lead and give the desired resistance to corrosion.

In some applications it may be found unnecessary to provide a lead coating, the depressions in the grid serving to hold lubricating oil and so reduce friction.

In forming the bearing elements it will be found desirable to anneal between draws and it may also be found desirable to anneal after completion of the bearing and prior to application of the lead coating to soften the bearing metal and improve its frictional properties.

Various modifications will occur to those skilled in the art. The metals recommended for the bearing backs and the bearing surfaces are the ones now found to be best in practice but obviously other materials may be substituted if desired in the application of my invention.

I claim:

1. The method of making cylindrical bearings lined inside and out with bearing metal which consists in preparing a blank of sheet metal with a relatively thin layer of bearing metal bonded thereto, forming from the blank a cylindrical bearing having the bearing metal on the exterior thereof, preparing a second blank of sheet metal with a relatively thin layer of bearing metal bonded thereto, forming from the blank a cylindrical bearing having the bearing metal on the interior thereof, pressing the second bearing element into the first bearing element, finish machining the bearing, and annealing the bearing to soften the bearing metal and remove the effects of work-hardening.

2. The method of making cylindrical bearings lined inside and out with bearing metal which consists in preparing a blank of sheet metal with a relatively thin layer of bearing metal bonded thereto, forming from the blank a cup having bearing metal on the exterior thereof, removing the end of the cup and trimming the same to provide a cylindrical bearing having bearing metal on the exterior thereof, preparing a second blank of sheet metal with a relatively thin layer of bearing metal bonded thereto, forming from the blank a cup having bearing metal on the interior thereof, removing the end of the cup and trimming the same to provide a cylindrical bearing having bearing metal on the interior thereof, and pressing the second bearing element into the first bearing element.

EUGENE B. ETCHELLS.